United States Patent
Freeman et al.

(10) Patent No.: US 6,919,903 B2
(45) Date of Patent: Jul. 19, 2005

(54) TEXTURE SYNTHESIS AND TRANSFER FOR PIXEL IMAGES

(75) Inventors: William T. Freeman, Acton, MA (US); Alexei Efros, Berkeley, CA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 143 days.

(21) Appl. No.: 09/798,147

(22) Filed: Mar. 2, 2001

(65) Prior Publication Data

US 2002/0122043 A1 Sep. 5, 2002

(51) Int. Cl.[7] .................................. G09G 5/00
(52) U.S. Cl. ......................................... 345/582
(58) Field of Search ............................. 345/581, 589, 345/583, 588, 612, 613, 582, 629, 552, 584

(56) References Cited

U.S. PATENT DOCUMENTS

| | | | | |
|---|---|---|---|---|
| 5,889,526 A | * | 3/1999 | Hashimoto | ................... 345/582 |
| 6,011,557 A | * | 1/2000 | Keskes et al. | ............... 345/582 |
| 6,044,168 A | * | 3/2000 | Tuceryan et al. | ........... 382/118 |
| 6,549,660 B1 | * | 4/2003 | Lipson et al. | ................ 382/224 |
| 6,593,933 B1 | * | 7/2003 | Xu et al. | ...................... 345/586 |
| 6,639,597 B1 | * | 10/2003 | Zwicker et al. | ............. 345/427 |
| 2001/0045956 A1 | * | 11/2001 | Hurley et al. | ................ 345/582 |
| 2002/0060686 A1 | * | 5/2002 | Matsumoto et al. | ......... 345/582 |

* cited by examiner

Primary Examiner—Jeffrey Brier
Assistant Examiner—J. Amini
(74) Attorney, Agent, or Firm—Dirk Brinkman; Andrew J. Curtin

(57) ABSTRACT

The invention provides an image-based method for generating novel visual appearance in a new image. Synthetic texture is stitching together from small patches in existing images. First, we use a least cost path determination to determine the local boundaries between the patches. Second, we perform texture transfer by rendering an arbitrary object with a synthetic texture taken from a different object. More generally, we provide methods for rendering entire images in styles of different images. The method works directly on pixel images, and does not require 3D information.

13 Claims, 5 Drawing Sheets

TEXTURE SYNTHESIS AND TRANSFER FOR PIXEL IMAGES

FIELD OF THE INVENTION

The present invention relates generally to the field of computer graphics, and more particularly to texture synthesis and transfer for pixel-based images.

BACKGROUND OF THE INVENTION

In the past decade, the field of computer graphics has experienced numerous advances in the field of processing images. Researchers and developers have described how to sample real world images, and using the samples to synthesize novel views of the real world in a virtual environment, rather than recreating the physical world from scratch.

In turn, this has generated interest in texture synthesis methods. In computer graphics, "texture" is a digital representation markings on a surface of an object. In addition, texture captures other qualities, such as color and brightness. Texture can also encode transparent and reflective qualities. After a texture has been defined, the texture can be "wrapped" around a 3D object. This is called texture mapping. Well-defined textures are very important for rendering realistic images. However, textures generally require a lot of storage and take time to acquire, therefore, synthetic texture generation is an important field.

Texture synthesis should be able to take a small sample of texture, ideally as small as possible, and generate an unlimited amount of image data. The synthesized texture may not be exactly like the original, but most viewers should perceive it as such.

Furthermore, the method should be able to map the synthesized texture to any arbitrary model or object.

While the problem of texture analysis and synthesis from real images has had a long history in the field of computer vision and statistics, it was not until recently that the quality of results reached a level acceptable for use in computer graphics, see David J. Heeger and James R. Bergen, "Pyramid-based texture analysis/synthesis," *SIGGRAPH '95*, pages 229–238, 1995. They described a texture model in terms of histograms of filter responses at multiple scales and orientations. It turned out that matching these histograms iteratively at different spatial scales was enough to produce impressive synthetic results for stochastic textures. However, their method did not capture important relationships across scales and orientations because the histograms measure marginal, not joint, statistics. Thus, their method failed for highly structured textures.

Several attempts have been made to extend their model to capture a wider range of textures, including J. S. De Bonet, "Multiresolution sampling procedure for analysis and synthesis of texture images, "*SIGGRAPH '97*, pages 361–368, 1997. De Bonet sampled from conditional distribution over multiple scales. Bonet was extended by Portilla et al., see Javier Portilla and Eero P Simoncelli, "A parametric texture model based on joint statistics of complex wavelet coefficients. *International Journal of Computer Vision*, 40(1):49–71, December 2000. They matched both first and second order properties of wavelet coefficients. While important from a theoretical point of view, neither method was successful at capturing local detail of many structured textures.

A different approach was to directly model pixels given their spatial neighborhoods, see Alexei A. Efros and Thomas K. Leung, "Texture synthesis by non-parametric sampling," *International Conference on Computer Vision*, pages 1033–1038, September 1999. They described a simple method of "growing" texture one pixel at a time. The conditional distribution of each pixel, given all its neighbors synthesized so far, was estimated by searching the sample image and finding all similar neighborhoods. That method produced very good results for a wide range of textures. However, a full search of the input image was required to synthesize every single pixel, which made the method very slow.

That method was accelerated by about two orders of magnitude by using a multi-scale image pyramid, and clustering pixel neighborhoods, see Li-Yi Wei and Marc Levoy, "Fast texture synthesis using tree-structured vector quantization," *SIGGRAPH 2000*, pages 479–488, 2000, based on work described by Kris Popat and Rosalind W. Picard, "Novel cluster-based probability model for texture synthesis, classification, and compression," *Proc. SPIE Visual Comm. and Image Processing*, 1993. However, with these optimizations, the best matching neighborhoods were frequently not found. Therefore, many textures, especially these with high frequency structure, such as images of text, were not well synthesized.

Another very simple method took random square blocks from an input texture and placed the blocks randomly onto a synthesized texture, see Xu, B. Guo, and H.-Y. Shum, "Chaos mosaic: Fast and memory efficient texture synthesis," Technical Report MSR-TR-2000-32, Microsoft Research, April 2000. That method included alpha blending to avoid edge artifacts. While their method failed for highly structured textures, e.g., a checker-board pattern, due to boundary inconsistencies, it worked no worse than other more complicated methods for most semi-stochastic texture methods.

One curious fact about the one-pixel-at-a-time synthesis method of Efros et al. was that for most complex textures very few pixels actually had a choice of values that could be assigned to them. That is, during the synthesis process most pixels had their values totally determined by what had been synthesized so far. For example, if the pattern was circles on a plane, then soon after the synthesis of a particular circle was started, all the remaining pixels of that circle, plus some surrounding ones, were completely determined. In this extreme case, the circle would be called the texture element. This same effect persisted to a lesser extent even when the texture was more stochastic, and there were no obvious texels. This meant that a lot of searching work was wasted on pixels whose "fate" had already been determined.

It could be possible that the units of synthesis should be something bigger than a pixel. If these units could some how be determined, then the process of texture synthesis would be akin to putting together an M. C. Escher jigsaw puzzle of illusory and seamless improbable tessellations. Of course, determining precisely the size and shapes of these units, for a given texture, and how to put the units together hits at the heart of texture analysis—an open problem in computer vision.

Therefore, there still is a need for a simple texture synthesis and transfer method. The method should allow one to synthesize unlimited amounts of new textures from existing textures, and to map the synthesized textures in a consistent manner. It should be possible to synthesize textures in a fast and reliable way, and in a way that lets one control the texture synthesis. For example, it should be possible to cut and paste material properties. It should also be possible to gather data for a particle texture "style" in which something should be rendered, for example, an orange peel, and then to render some other object in that style as shown in FIG. 1.

SUMMARY OF THE INVENTION

The invention provides an image-based method for generating novel visual appearance in a new image. Synthetic texture is stitching together from small patches in existing images. First, we use a least cost path determination to determine the local boundaries between the patches. Second, we perform texture transfer by rendering an arbitrary object with a synthetic texture taken from a different object. More generally, we provide methods for rendering entire images in styles of different images. The method works directly on pixel images, and does not require 3D information.

More specifically, the invention provides a method for generating texture for a pixel image. The pixel image is partitioned into a plurality of blocks in a predetermined order, and for each block further processed by the following steps. A set of texture blocks is searched for a next block that best matches an adjacent previous block in a region where the previous and next block overlap. A least cost path is determined in the overlap region, and the next block is inserted adjacent to the previous block according to the least cost path to synthesize texture.

DETAILED DESCRIPTION OF THE PREFERRED EMBODIMENT

Texture Synthesis

With our invention, we provide a patch-based texture synthesis and transfer method.

Figure 1:
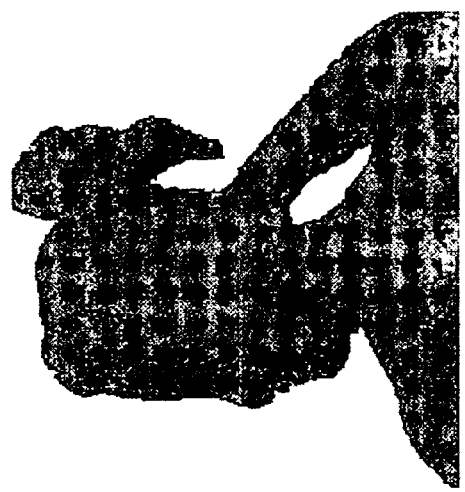
FIG. 1 is a block diagram of an object textured according to the texture of another object.
Figure 1:
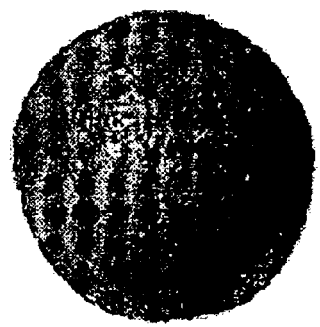
Figure 1:
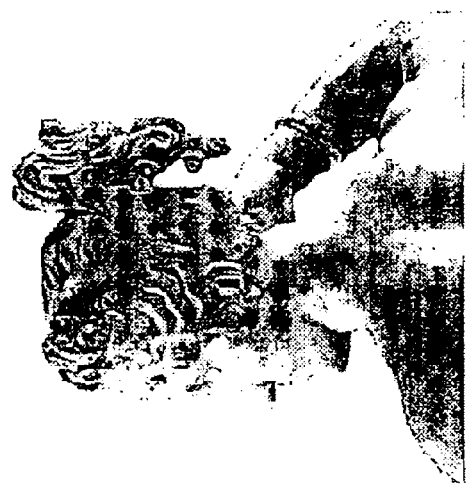
Figure 2:
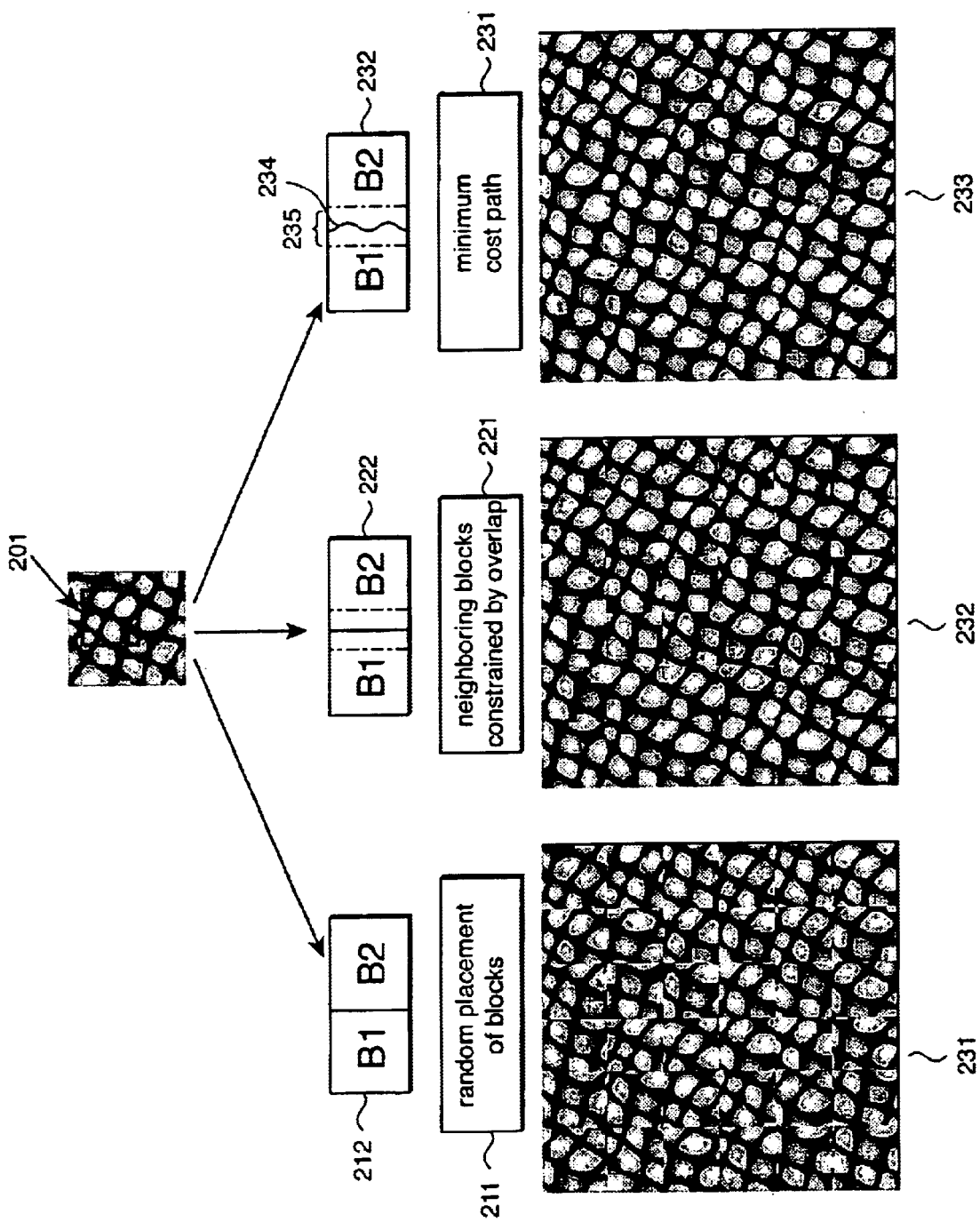
FIG. 2 is a block diagram of texture synthesis according to our invention.

The idea of our invention is developed as shown in FIG. 2. Our unit of synthesis is $B_i$ 201, a square block, of user-specified size, selected from a set $S_B$ of all such blocks in an input texture image 202. To generate a new synthetic texture image, as a first step, we simply tile the synthetic texture image 231 with blocks taken randomly 211 from the set $S_B$, to what ever size desired. In this simple case, the blocks (B1–B2) 212 abut each other. The larger synthetic texture image already looks somewhat reasonable, and for some textures will perform no worse than many previous much more complicated methods. However, the result is not completely satisfactory. For most structured textures, no amount of smoothing can completely hide the fact that the texture at the edges of the randomly selected blocks does not match.

As a refinement, we overlap 221 the selected blocks (B1–B2) 222 while tiling a synthetic image 232. With respect to each block, the overlap can be considered to be to the left and top of a previous block, when selecting blocks in a raster scan order. Note, for any blocks in the top row, there is no top overlap to be considered, the same for each first block of each row with respect to the left overlap. The very first block can be randomly picked, since there is no overlap. Now, instead of picking a random block from the input texture image 201, we search the set $S_B$ for a block (B2) 222 that agrees in the region of overlap, by some error measurement. However, the edges between the blocks are still somewhat noticeable. Smoothing across the edges will lessen this problem.

We solve this problem in a more principled way in our final refinement. Here, we select and tile with overlap as above. But now, we let the blocks (B1–B2) 232 have "ragged" edges in order to better approximate the features in the input texture image. Now, before placing a selected block into a synthetic image 233, we measure an error surface in the ragged overlap region. We determine a minimum cost path 234 through that error surface, and declare that to be the boundary between the blocks.

Figure 3:
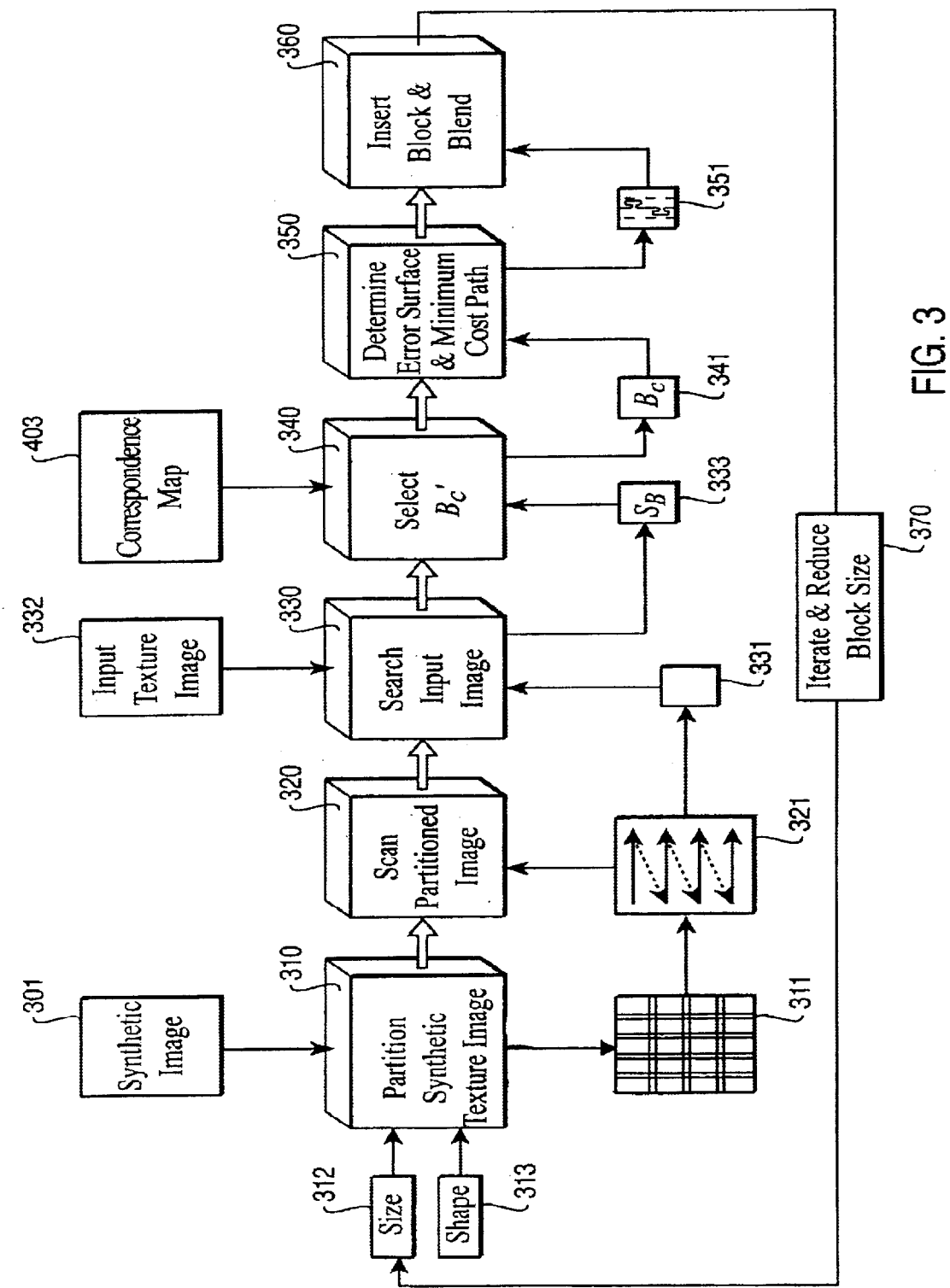
FIG. 3 is a flow diagram of a synthesis method according to our invention.

FIG. 3 details the steps of the patch-based texture synthesis method 300 according to our invention. We partition 310 a synthetic image 301 into a plurality of overlapping blocks 311. The size 312 of the partitioned blocks can be user selected. That is, the size of the block should be large enough to capture all relevant structures in the texture, but small enough to reflect the interaction between these structures, i.e., the minimum cost path. Note, the block do not need to be square. The invention allows the blocks to have any user selected shape 313 that will regularly tile the new image, for example, rectangles, triangles, or hexagons.

We scan 320 the partitioned image 321, in steps of one block 331, minus overlap. The scan can be left-to-right for each row of blocks in a top-to-down raster scan order 321.

For each scanned block 331, search an input texture image 332, for a set of blocks $S_B$ 333 that satisfy some constraint in the overlap region, within some error measurement, as described above. Select 340 one block $B_i$ 341 from the set $S_B$ 331. In one embodiment, the block is selected randomly, in another embodiment the best matching block is selected. For texture transfer, as described below, the selection 340 is further constrained.

Determine 350 an error surface between the randomly selected next block and each previous block in the overlap region. Find a minimum cost path 351 along the error surface. In the preferred embodiment, the minimum cost path is determined by dynamic programming. Make the minimum cost path the "ragged" edge between the blocks. Insert the block 360 into the synthetic image 311 according to the ragged edge, with optional alpha blending, and repeat for the next block, until all blocks are done.

In the preferred embodiment, the amount of the overlap is ⅙ of length of a side of the block. The difference between two blocks in the overlap region can be expressed with a suitable error metric, for example, the sum of the squares (L2-norm) of the pixels, or the sum of the absolute values (L1-Norm). The error tolerance is set to be within 0.1 times the error of the best matching block. Because we constrain the search region, we can optimize the search process by using a multidimensional search (k-d) tree without compromising the quality of our results.

Texture Transfer

Figure 4:
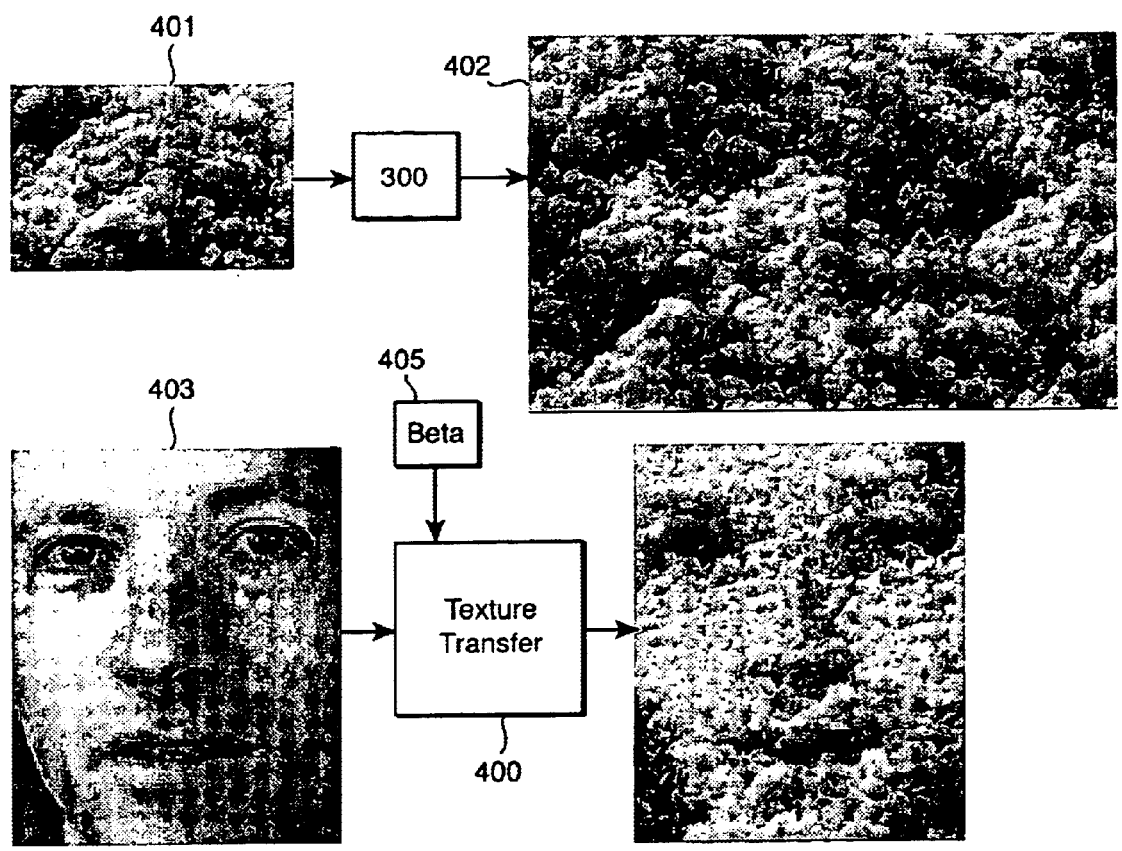
FIG. 4 is a block diagram of texture transferring according to our invention.

In order to provide texture transfer, we can augment our synthesis method 300, as shown in FIG. 4. From a small input texture image (rice) 401 we synthesize 300 a synthetic image 402 that is large enough to match an image of an object to which we transfer texture, in this case a man's face. We transfer texture 400 by requiring each block of synthetic texture to satisfy correspondence maps 403, as well as to satisfy the texture synthesis requirements. The correspondence maps can be obtained by low-pass filtering the images to remove high frequency components in the images.

For example, from the sample input rice texture 401, our synthesis method 300 synthesizes the larger synthetic texture image 402. The correspondence map 403, of the male face, is used to constrain the texture transfer. The textured transferred image 404 show texturing of the correspondence map 402 with the synthetic texture image 402. Bright patches of the face and bright patches of the rice are defined to have a low correspondence error. The synthesized rice texture conforms to this second constraint, yielding the image 404 where the man's face image appears to be rendered in rice.

For texture transfer 400, our method respects two independent constraints. First, the textured transferred image 404 is constrained locally by the synthetic texture image 402, and second, the image 404 is also constrained globally by the correspondence map 403.

In order to do this, the step 340 selecting the block $B_i$ is modified as follows. In addition to ranking the blocks of the set $B_S$ on how well they satisfy the overlap constrains with the texture image synthesized so far, now we also rank the blocks in the set by how well they match the destination texture patch in the final image according to the correspondence map 403. The two ranking are merged with a user-specified parameter $\beta$, which determines the tradeoff between the local and global constraints, and the block is selected as described above.

Sometimes, one synthesis pass may be insufficient to produce a visually pleasing results because of the added global constraint. In such cases, as shown in FIG. 3, we iterate 370 over the synthetic image, reducing the size 312 of the block with each iteration. Additionally, when iterating, the local texture constraint of the blocks are matched with the neighboring blocks on the overlap regions, and also with whatever was synthesized in the block during the previous iteration.

Iterating generally improves the method 300. The method 300 starts by using large blocks to roughly assign texture to the synthetic image, and then uses smaller blocks to make sure textures in neighboring blocks fit well together. Typically, three to five iterations are sufficient, reducing the block size by a third each time.

Figure 5A:
FIGS. 5a–d are texture transfer method applied to a photograph.
Figure 5B:
Figure 5C:
Figure 5D:

As shown in FIGS. 5a–c, our texture transfer method can also be applied to render a photograph using a line drawing texture of a particular input texture drawing, or to transfer material surface texture onto a new image. Here, an input texture image 5a in the form of a drawing by Picasso is to be applied to a photograph of Richard Feynman 5c. FIG. 5b shows a low-pass filtered version of the drawing to be used as a source correspondence map for the drawing. The Feynman photograph 5c is used as its own correspondence map. The result in FIG. 5d definitely shows the influence of Picasso, here Dr. Feynman is no longer smiling.

3D Solid Models

So far, the invention has been described with respect to texturing surfaces of 3D object. It should also be understood that the invention can also be extended to texture solid objects. In this case, the overlap region between, e.g., two cubes, is a parallelepiped, and the least cost path becomes a least cost surface.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for generating texture for a single input pixel image, comprising:

partitioning the input pixel image into a plurality of blocks of pixels of the input pixel image to be assigned texture, arranged in a predetermined order, and for each block in the predetermined order further comprising:

searching a set of texture blocks for a next texture block for the input pixel image that best matches a previous texture block in a region where the previous texture block and the next texture block overlap;

finding a minimum cost path through the region; and inserting the next texture block adjacent to the previous texture block in the input pixel image according to the minimum cost path and wherein an amount of the overlap in the region is ⅙ of a length of a side of the block.

2. The method of claim 1 wherein a first texture block is selected randomly from the set of texture blocks.

3. The method of claim 1 wherein a size of each of the plurality of blocks and each texture block captures all relevant structures in the texture.

4. The method of claim 1 wherein each block and each texture block is rectangular.

5. The method of claim 1 wherein a difference between the block and the next texture block is expressed with an error metric.

6. The method of claim 5 wherein the error metric is a sum of squares of intensity values of pixels in the block and the next texture block.

7. The method of claim 1 further comprising:

searching the set of texture blocks using a multi-dimensional search.

8. The method of claim 1 further comprising:

measuring an error surface in the region where the previous texture block and the next texture block overlap, and determining the minimum cost path from the error surface.

9. The method of claim 1 further comprising:

alpha blending the next texture block with the previous texture block.

10. The method of claim 1 wherein the predetermined order is a raster scan.

11. The method of claim 1 wherein the pixel image initially is empty and of a size larger than the set of texture blocks.

12. The method of claim 1 wherein the pixel image initially includes a destination image, and further comprising:

low-pass filtering the destination image to generate a correspondence map of the destination image, and wherein the next texture block matches the previous texture block locally, and the correspondence map globally so as to texture the destination image according to the set of texture blocks.

13. The method of claim 1 wherein the pixel image, the blocks and the set of texture blocks are three-dimensional and wherein the region of overlap is a parallelepiped, and the minimum cost path is a minimum cost surface.

* * * * *